United States Patent
Allen

(10) Patent No.: US 8,167,621 B2
(45) Date of Patent: May 1, 2012

(54) TRAINING DEVICE FOR FORCIBLY OPENING A LOCKED DOOR

(75) Inventor: Thomas J. Allen, Prospect, CT (US)

(73) Assignee: Red Barn Innovations LLC, Prospect, CT (US)

( * ) Notice: Subject to any disclaimer, the term of this patent is extended or adjusted under 35 U.S.C. 154(b) by 1339 days.

(21) Appl. No.: 11/818,008

(22) Filed: Jun. 13, 2007

(65) Prior Publication Data

US 2008/0014564 A1    Jan. 17, 2008

Related U.S. Application Data

(60) Provisional application No. 60/814,654, filed on Jun. 16, 2006.

(51) Int. Cl.
*G09B 19/00* (2006.01)

(52) U.S. Cl. ............ 434/226; 52/204.1; 52/207; 52/213; 70/6; 70/9; 70/10; 70/11; 109/23; 434/219; 434/258; 434/387

(58) Field of Classification Search .................. 434/226, 434/387, 219, 258; 109/23; 52/204.1, 207, 52/213; 70/6, 9, 10, 11
See application file for complete search history.

(56) References Cited

U.S. PATENT DOCUMENTS

| | | | | |
|---|---|---|---|---|
| 2,925,894 A * | 2/1960 | Lee, Jr. et al. | .................... | 49/400 |
| 3,015,348 A * | 1/1962 | Zern | .............................. | 144/2.1 |
| 3,142,641 A * | 7/1964 | Lachat | .......................... | 210/144 |
| 3,223,057 A * | 12/1965 | Lingal | ........................ | 109/59 R |
| 3,643,936 A * | 2/1972 | Hostetter | ..................... | 269/190 |
| 4,993,764 A * | 2/1991 | Barker | ......................... | 292/340 |
| 5,040,393 A * | 8/1991 | Rossebo | ......................... | 70/370 |
| 5,094,483 A * | 3/1992 | James | ............................. | 292/39 |
| 5,135,272 A * | 8/1992 | Centofante | ................... | 292/293 |
| 5,531,491 A * | 7/1996 | Skelton | ......................... | 292/293 |
| 5,595,075 A * | 1/1997 | Chen | ................................. | 70/95 |
| 5,667,262 A * | 9/1997 | Planchon | ..................... | 292/288 |
| 5,829,947 A * | 11/1998 | Litten | .......................... | 414/537 |
| 5,896,760 A * | 4/1999 | Osburn | ............................. | 70/19 |
| 5,906,493 A | 5/1999 | Bishop | | |
| 6,079,941 A * | 6/2000 | Lee | ............................... | 414/812 |
| 6,358,057 B1 | 3/2002 | Bishop | | |
| 6,877,988 B2 | 4/2005 | Phillips et al. | | |
| 6,968,647 B2 | 11/2005 | Levesque et al. | | |
| 6,976,289 B1 | 12/2005 | Luca | | |
| 7,611,356 B1 * | 11/2009 | Bishop | .......................... | 434/226 |

(Continued)

FOREIGN PATENT DOCUMENTS

DE     3531702 A1    3/1987

*Primary Examiner* — Xuan Thai
*Assistant Examiner* — Jack Yip
(74) *Attorney, Agent, or Firm* — Charles F. Costello

(57) ABSTRACT

A training device is described for perfecting the art of forcibly opening a door in an emergency. The training device has a frame and a door placed in the frame. A dead bolt is mounted in the door and protrudes from the door in a locked position relative to the frame. A vise is attached to the frame. The vise has a movable jaw mounted on a block and a stationary jaw, and means for tightening the movable jaw against the dead bolt. The dead bolt protrudes from the door between the stationary and movable jaw. A method of using the training device causes the door to pivot and the dead bolt to move off of the vise, thus simulating an actual forced opening.

18 Claims, 6 Drawing Sheets

U.S. PATENT DOCUMENTS

| | | |
|---|---|---|
| 7,789,666 B2 * | 9/2010 | Sovine et al. ................ 434/226 |
| 7,972,139 B2 * | 7/2011 | Staub ........................... 434/226 |
| 2003/0141687 A1 * | 7/2003 | Wixted et al. .............. 280/47.35 |
| 2005/0050816 A1 * | 3/2005 | Manning et al. ................ 52/213 |
| 2005/0058974 A1 * | 3/2005 | Phillips et al. ................ 434/226 |
| 2007/0194579 A1 * | 8/2007 | Fiedler et al. ................ 292/293 |
| 2007/0209681 A1 * | 9/2007 | Wade .............................. 134/10 |
| 2011/0025076 A1 * | 2/2011 | Shelley ......................... 292/216 |

* cited by examiner

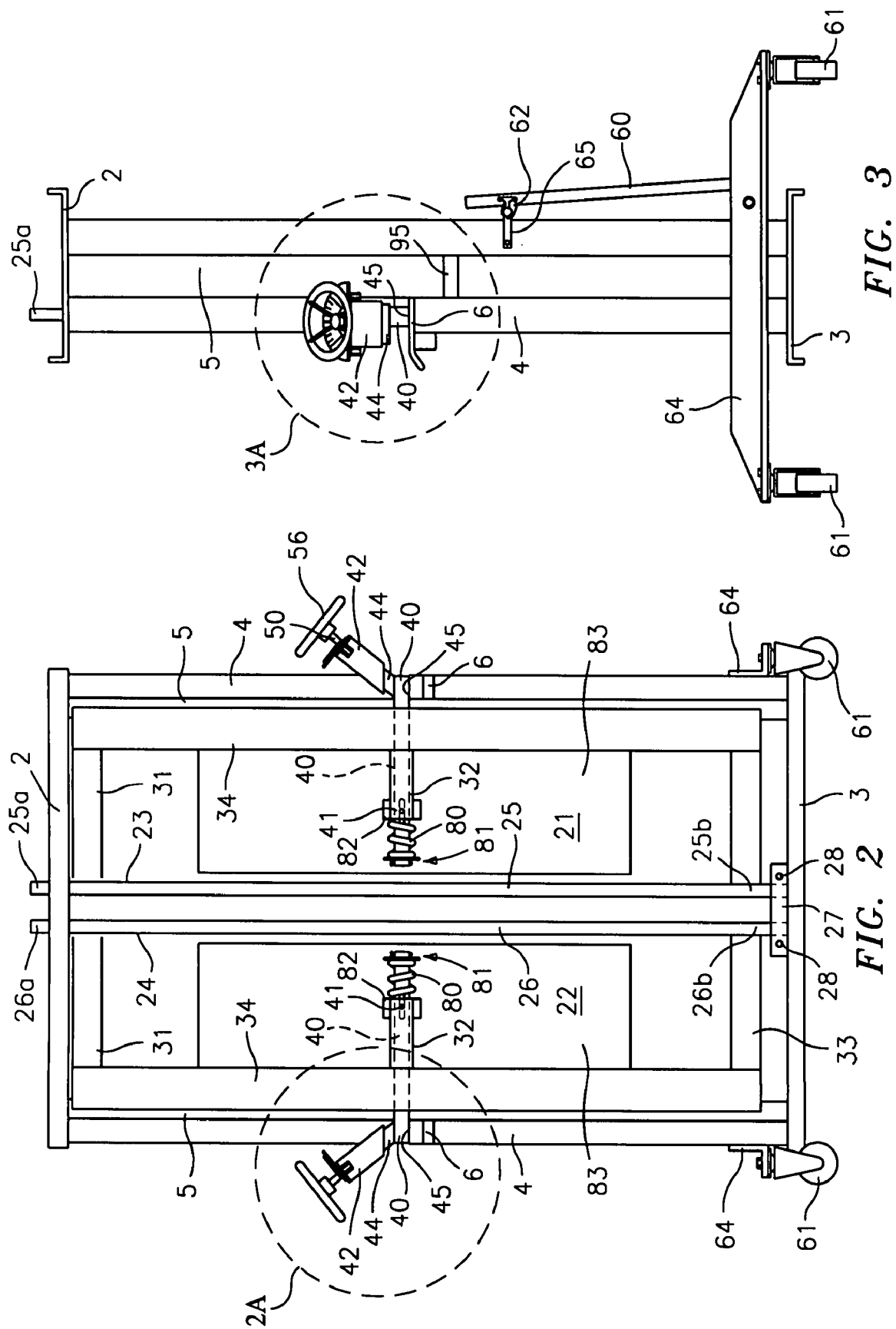

TRAINING DEVICE FOR FORCIBLY OPENING A LOCKED DOOR

CROSS-REFERENCE TO RELATED APPLICATIONS

This application claims the benefit of U.S. Provisional Application 60/814,654, filed Jun. 16, 2006.

BACKGROUND OF THE INVENTION

Various municipal, state or federal employees have to open a locked door in a building or residence in an emergency. These employees include but are not limited to fire fighters, emergency and security personnel, law enforcement officers, for example, members of a special weapons and tactics team, and other persons having similar responsibilities.

To know how to correctly and efficiently open a locked door in an emergency, a person needs to be trained and then to perfect the knowledge by practice. A need has developed in the art for a training device that can be used more than once to learn and perfect the art of forcibly opening a locked door. The training device described herein satisfies this need to learn the art of forcibly opening a locked door without destroying or damaging the device each time.

SUMMARY OF THE INVENTION

The invention is described in the following embodiments:
1. In a training device comprising a frame, a door placed in the frame and a dead bolt mounted in the door in a locked position relative to the frame, the improvement comprising
   a surface adjacent to the dead bolt and
   means for tightening the surface against the dead bolt.
2. A training device comprising
   a frame having a header and a saddle;
   a door placed in the frame, and having a first and a second edge perpendicular to the header and saddle;
   a dead bolt mounted in the door and extending out of the first edge in a locked position relative to the frame;
   a surface adjacent to the dead bolt;
   means for tightening the surface against the dead bolt;
   a rod attached to the second edge, the rod having
   an upper and a lower end, the upper end mounted to the header and the lower end mounted to the saddle.
3. The device of embodiment 2 wherein the door is an inswing door.
4. The device of embodiment 3 having a grate pivotally mounted to the saddle.
5. The device of embodiment 4 having a rectangular shaped saddle and two wheels attached to each of the short sides of the rectangular saddle.
6. The device of embodiment 5 wherein the two wheels on one of the short sides is mounted on a swivel to form a caster.
7. In a training device comprising a frame, a door placed in the frame, and a dead bolt mounted in the door and protruding from the door in a locked position relative to the frame, the improvement comprising a vise having
   a movable jaw mounted on a block, and
   a stationary jaw, the dead bolt protruding from the door between the stationary and movable jaw, and
   means for tightening the movable jaw against the dead bolt.
8. The training device of embodiment 7 wherein the movable jaw is wedge-shaped relative to the block.
9. The training device of embodiment 8 wherein the block has a proximal end adjacent to the means for tightening.
10. The training device of embodiment 9 wherein the proximal end has an opening.
11. The training device of embodiment 10 wherein the means for tightening comprises a shaft having a distal end mounted in the opening.
12. The training device of embodiment 11 wherein the means for tightening comprises the shaft having an external screw thread and means for rotating the shaft.
13. The training device of embodiment 12 wherein the means for tightening comprises a housing attached to the frame, the housing having an opening with an internal screw thread to accommodate the external screw thread of the shaft.
14. A training device comprising
   a frame having a header and a saddle;
   a left hand and a right hand inswing door placed in the frame, each door having an interior edge and
   a dead bolt mounted in each door and protruding from the door in a locked position relative to the frame;
   a rod attached to each interior edge and having
   an upper and a lower end, the upper end of each rod mounted to the header and the lower end of each rod mounted to the saddle;
   a vise having a movable jaw mounted on a block, and a stationary jaw, the vice attached to the frame such that the dead bolt is protruding between the stationary and movable jaw;
   means for tightening the movable jaw against the dead bolt; and
   a grate pivotally mounted to the saddle.
15. The training device of embodiment 14 wherein the movable jaw is wedge-shaped relative to the block.
16. The training device of embodiment 15 wherein the block has a proximal end adjacent to the means for tightening, and the proximal end has an opening.
17. The training device of embodiment 16 wherein the means for tightening comprises a shaft having a distal end mounted in the opening, and the shaft has an external screw thread and means for rotating the shaft.
18. The training device of embodiment 17 wherein the means for tightening comprises a housing attached to the frame, the housing having an opening with an internal screw thread to accommodate the external screw thread of the shaft.
19. A method of using the training device of embodiment 2 comprising
   step for bracing the training device;
   positioning a person adjacent to the first edge and within an arm's length of the door;
   wedging a tool between the frame and the first edge of the door, and at a location above or below the dead bolt, the tool having a proximal end;
   securing the tool between the frame and the door by striking the proximal end; and
   rotating the tool to cause the door to pivot and the dead bolt to move off of the surface.
20. The method of embodiment 19 wherein the step for bracing comprises applying a weight to a grate pivotally mounted to the saddle, the grate in a position about perpendicular to the door.

DESCRIPTION OF THE DRAWINGS

FIGS. 2 and 3 are respectively back and left side views of FIG. 1, showing the grate in a raised position;

DETAILED DESCRIPTION

Figure 1:
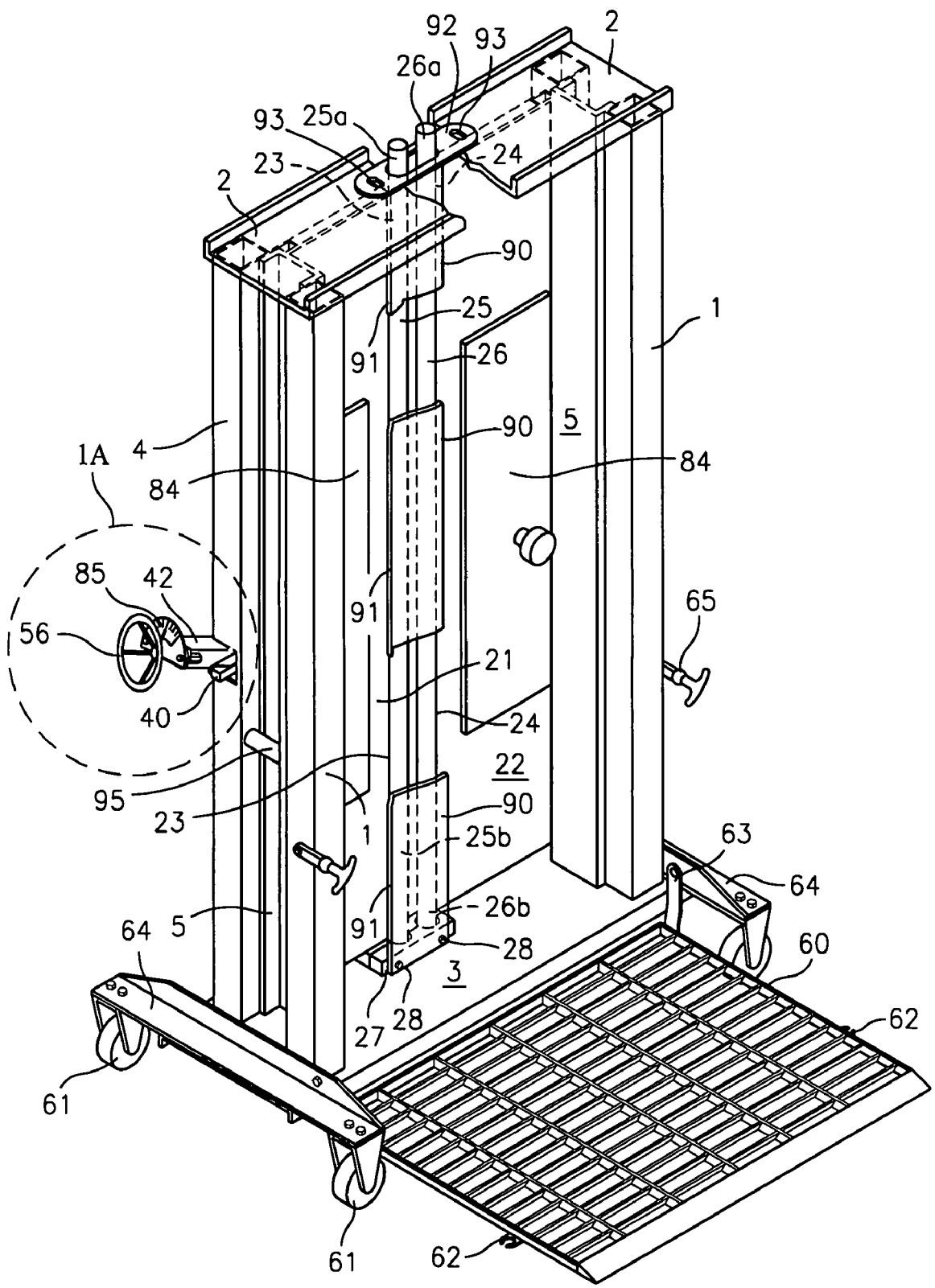
FIG. 1 is a front perspective view of a training device of this invention.
Figure 1A:
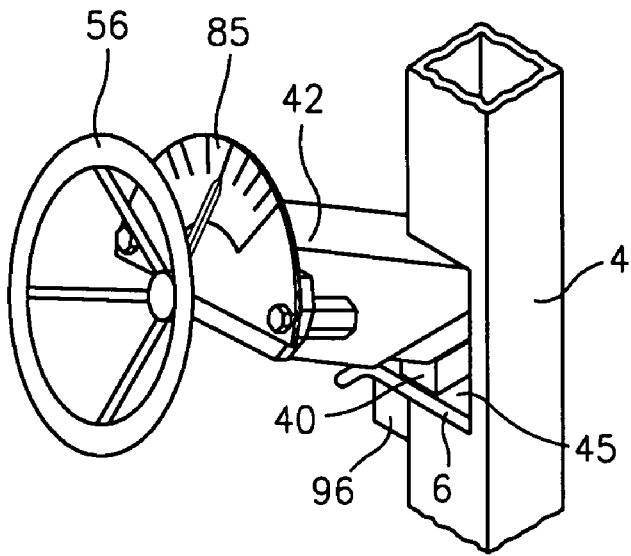
FIG. 1A is a breakaway and expanded view of the circled portion shown in FIG. 1.

FIG. 1 shows a training device having a frame 1, and a left and right hand inswing door, numerals 21 and 22, respectively. The frame and doors are more fully described in FIG. 2 to 5 and 9.

Referring to FIG. 1 to 5, at the top and bottom of the frame 1 is a header 2 and a saddle 3, respectively. On each vertical side of the frame 1 is a jamb 4 that extends from the saddle 3 to the header 2. When the left and right hand inswing doors 21 and 22 are closed, a stop 5 on each vertical side of the frame 1 prevents the doors from going past the jamb 4. After it has been forcibly opened, a strike plate 6 assists in resetting the door 21 or 22 into the frame 1.

Figure 2A:
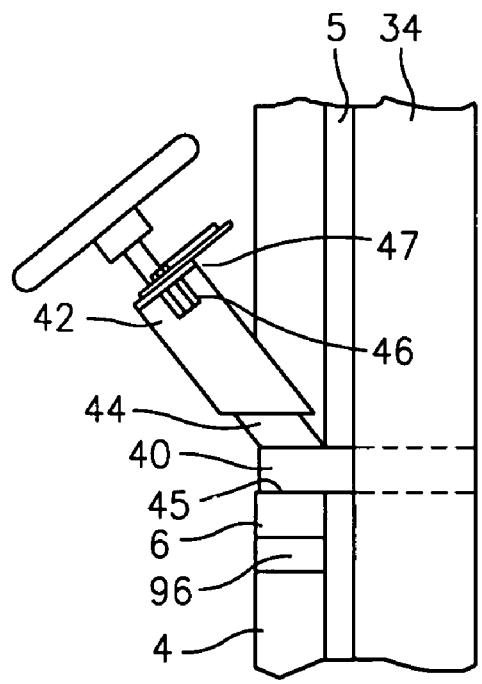
FIGS. 2A and 3A are breakaway and expanded views of the circled portions shown in FIGS. 2 and 3, respectively.
Figure 3A:
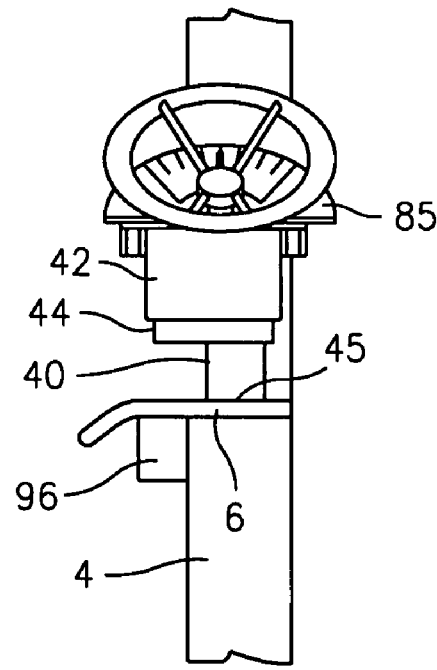

The doors 21 and 22 can be manufactured from one-eighth inch steel plate. Structural integrity is increased by welding a top and bottom rail, which are shown respectively as elements 31 and 33 in FIG. 2, to the back of each door. A lock rail 32 is also welded to the back of each door. The relationship of the lock rail 32 to the dead bolt 40 is more fully described below. Each rail can be manufactured from two inch by one inch tubing. As also shown in FIG. 2, a latch stile 34 is welded to the back of each door to increase flexural integrity. The latch stile 34 can be manufactured from a four inch C-channel support beam.

Figure 4:
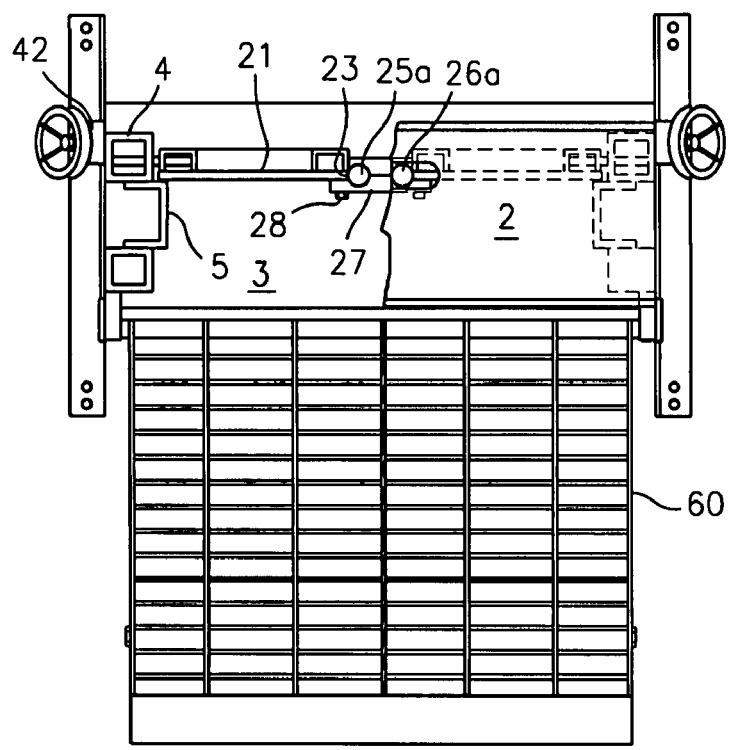
FIG. 4 is a partially cutaway top view and FIG. 5 is a bottom view of FIG. 1.

Referring to FIGS. 1, 2 and 4, the left hand and right hand inswing doors, 21 and 22, each have an interior edge, 23 and 24, respectively. A rod 25 and 26 is attached, for example, by welding, respectively to each interior edge 23 and 24. Each rod has an upper end 25a and 26a, and a lower end 25b and 26b. The upper end 25a and 26a of each rod 25 and 26 is movably mounted through an opening in the header 2. A portion of each upper end 25a and 26a can extend beyond the header 2. To add structural integrity, a steel plate 83 can be welded to each of the doors 21 and 22.

The training device is used by forcibly opening one of the doors 21 or 22. This will cause the respective rod 25 or 26 to pivotally move toward the other rod. To prevent the pivoting rod from causing an accident by pinching or squeezing a user's skin, the exposed portions of the rods 25 and 26 can be shielded by a sufficiently strong covering 90, for example, aluminum diamond plate. Also, a rubberized material 91 can be attached to the edges of the covering 90. The rubberized material 91 decreases the kinetic friction as the door 21 or 22 pivots under the covering 90. Alternatively, the adjacent surface of the door 21 and 22 can be coated with a lubricating plastic, for example, a high density polypropylene or silicone.

Above the saddle 3 is a two part plate 27. The two parts of the plate 27 are attached at each end by a bolt 28 or similar fastener. The lower ends 25b and 26b of each rod 25 and 26 are placed in two openings in the plate 27. The diameter of each opening is slightly larger that the diameter of each rod. For example, a $7/8^{th}$ inch opening is used with a $13/16^{th}$ inch rod.

This difference allows the rod 25 or 26 to pivot out of its vertical alignment when the respective door 21 or 22 is forcibly opened.

An aligning plate 92 is above the header 2. At each opposite end of the aligning plate 92 is an opening 93. The aligning plate 92 is attached to the header 2 by a fastener, for example, a bolt and screw, being inserted through each opening 93.

Only one part of the plate 27 is welded to the saddle 3. The lower end 25b and 26b of each rod 25 and 26 can be removed from the plate 27 by removing each bolt 28 and the part of the plate 27 not welded to the saddle 3. This allows either or both of the doors 21 and 22 to be removed from the frame 1.

Referring to FIG. 2, through an opening in the lock rail 32, a dead bolt 40 is attached to each door 21 and 22. The means for attaching can be, for example, a one-quarter inch roll pin 41 or similar fastener.

The preferred relationship between the lock rail 32 and roll pin 41 is that shown in FIG. 2. Specifically, as measured from the exterior edge of the jamb 4, the length of the lock rail 32 is about one-half the width of the door 21 or 22.

A support plate 82 is welded to each door 21 and 22 adjacent to the proximal end of the lock rail 32. The length of the support plate 82 is about four to five times the diameter of the roll pin 41.

A means for tensioning, for example, a coil spring 80, abuts the proximal end of the lock rail 32. The coil spring 80 is held in place by a pin 81 that is wedged or otherwise set in a hole that is drilled in the dead bolt 40 adjacent to the interior edge 23 and 24.

The distal end of each dead bolt 40 protrudes from the respective door 21 and 22 through a slot in the latch stile 34. The dead bolt 40 is held in a locked position against each jamb 4 of the frame 1 by movable and stationary jaws, 44 and 45, respectively. The roll pin 41 and the slot height allows either of the doors 21 or 22 to initially pivot about the dead bolt 40 as they are being forcibly opened. For this reason, the height of the slot in the latch stile 34 must always be greater that the height of the dead bolt. As a general statement, a slot height of at least about twice the height of the dead bolt is preferred.

Also, with repeated use and because of the frictional movement, the contact surfaces of the dead bolt 40, and the movable and stationary jaws, 44 and 45, respectively, will become thinner. To accommodate this thinning, the dead bolt 40 is allowed to pivot to provide for a tight fit between the surfaces.

FIG. 1 to 3 and 6 to 8 show a vise having a housing 42. The proximal and distal ends of the housing 42 are open. A block 43 is contained within, and extends beyond the distal end of the housing 42. The block 43 terminates in a movable jaw 44 that rests on one side of the dead bolt 40. As shown in FIGS. 2 and 3A, on the opposite side of the dead bolt 40 is a stationary jaw 45.

A strike plate 6 is attached to the jamb 4. After the left or right inswing door 21 or 22, respectively, is forcibly opened, the strike plate 6 assists in resetting the deadbolt between the movable and stationary jaws, 44 and 45, respectively.

Figure 6:
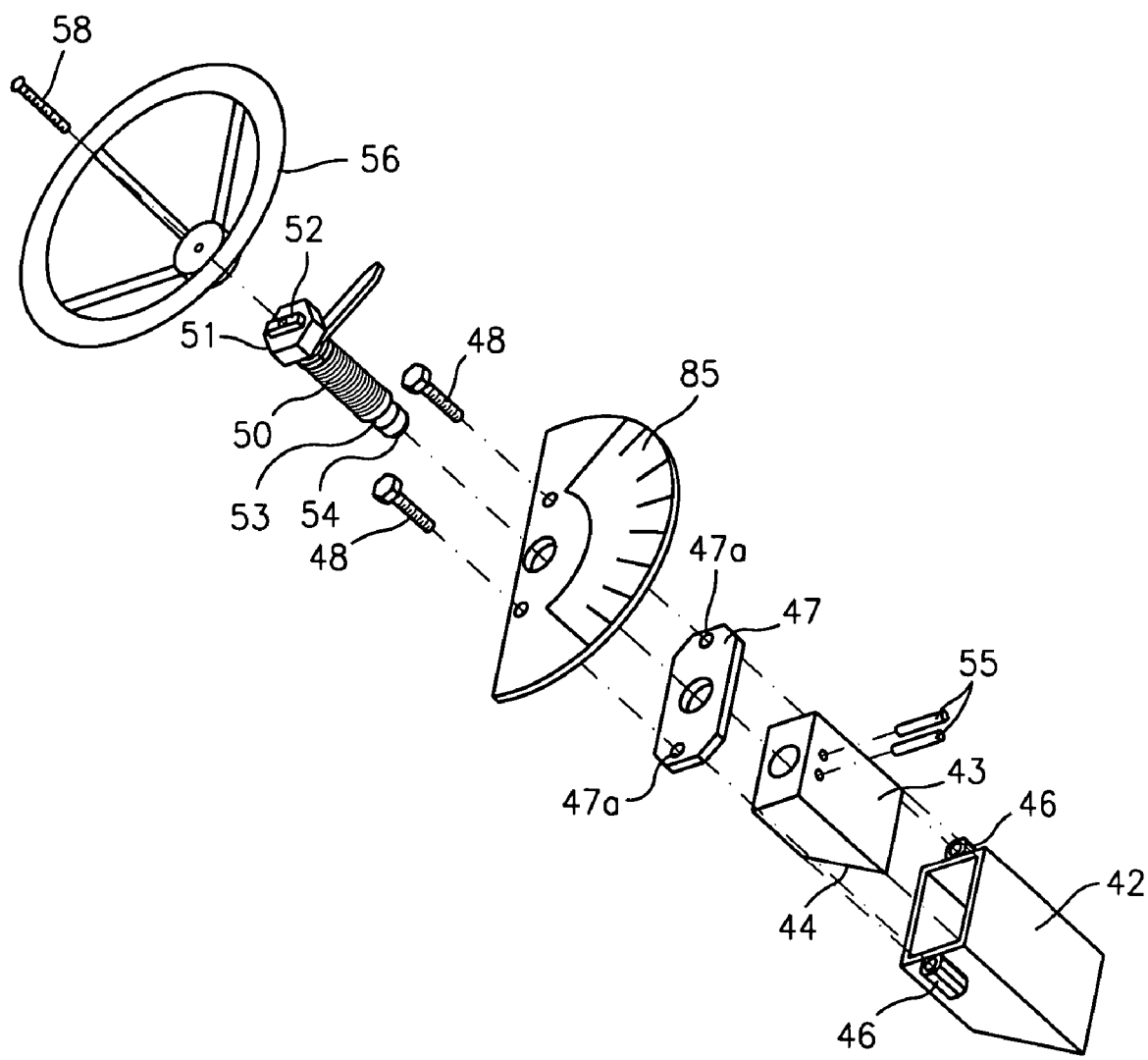
FIG. 6 is an expanded view of the left hand vise shown in FIGS. 1 and 1A.
Figure 7:
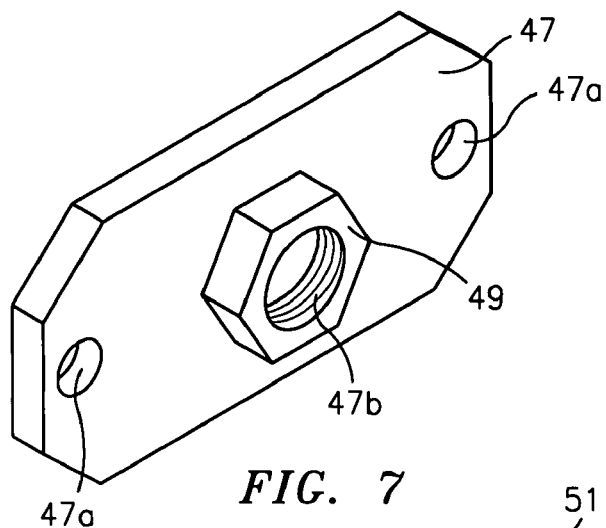
FIG. 7 is a bottom perspective view of the cover plate and FIG. 8 is a front view of the threaded shaft shown in FIG. 6.
Figure 8:
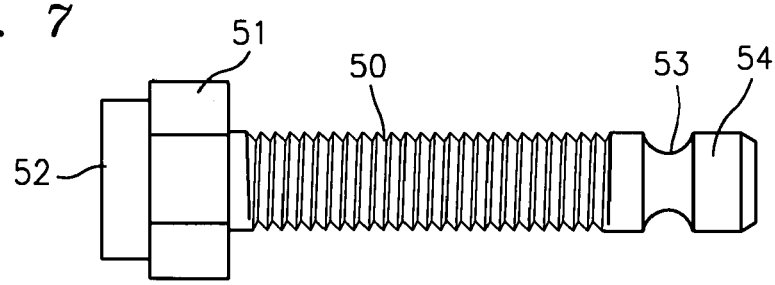

FIG. 6 to 8 specifically show a means for tightening the movable jaw 44 against the dead bolt 40. As shown in FIG. 6, two mounts 46 are welded to opposite sides of the housing 42. Each mount 46 is a one inch metal cube. Through the center of each mount 46 is a $5/16^{th}$ inch threaded opening having eighteen threads per inch. A cover plate 47 is attached to the proximal end of the housing 42. At each opposite end of the cover plate 47 is an opening 47a.

Referring to FIG. 7, the center of the cover plate 47 has an opening 47b. An acme nut 49 is welded to the cover plate 47.

The threaded opening in the acme nut 49 becomes part of and allows for controlled ingress and egress through the opening 47b.

A threaded shaft 50 is shown in FIGS. 6 and 8. The threaded shaft 50 has a three-quarter inch acme thread form that mates with the threaded opening in the acme nut 49 on the cover plate 47. At the proximal end of threaded shaft 50 is a three-quarter inch hexagonal nut 51. A one-half inch key 52 is formed on the top of the nut 51 by milling away two sides of the hexagonal nut 51. A concave surface 53 is adjacent to the distal end 54 of the threaded shaft 50.

A slot is provided in the wheel 56 to mate with the key 52 in the threaded shaft 50. To secure them, a fastener, for example, a screw 58, is securely attached through openings drilled through the centers of the wheel 56 and shaft 50. By turning the wheel 56, the shaft 50 can then be rotated to open or close the movable jaw 44.

Referring again to FIG. 6 to 8, the vise is assembled by placing the shaft 50 adjacent to the opening 47b and rotating the shaft 50 through the opening in the acme nut 49. To accommodate the shaft 50, the opening 47b is slightly larger than the opening in the acme nut 49. Alternatively, the opening 47b can have a thread form that is essentially identical to and meshes with the thread form in the opening of the acme nut 49.

The distal end 54 of the shaft 50 is inserted into an opening at the proximal end of block 43. The concave surface 53 is aligned with two holes on a side of the block 43. The concave surface 53 is held within the block 43 by placing a dowel 55 into each of the two holes. This allows the concave surface 53 to rotate within the block 43. To close the jaw 44, the wheel 56 rotates the shaft 50 and causes the distal end 54 to abut and lower the block 43. To open the jaw 44, the wheel 56 rotates the shaft 50 in the opposite direction and causes the block 43 to be raised by the concave surface 53 rotating against the dowels 55.

Referring to FIG. 6, block 43 is inserted into housing 42 and each opening 47a is aligned with a respective mount 46. The cover plate 47 is then secured onto the proximal end of housing 42 by inserting a threaded bolt 48 through each opening 47a and then threading it into the respective mount 46.

The jaws in the vise can be adjusted to simulate the pressure needed to open a door manufactured from steel, wood, composite and similar materials. Referring to FIGS. 1, 1A, 3, 3A and 6, a scale 85 can be placed adjacent to wheel 56. The scale is calibrated to approximate where to set the means for tightening to achieve the desired resistance for the type of door to be used for forcible entry training.

For a steel door, the pressure can be up to about 3000 pounds per square inch (herein "psi"). Normally, an average steel door can require about 2200 psi to be forcibly opened. A wood door can require up to about 1800 psi but normally requires below about 800 psi.

Figure 5:
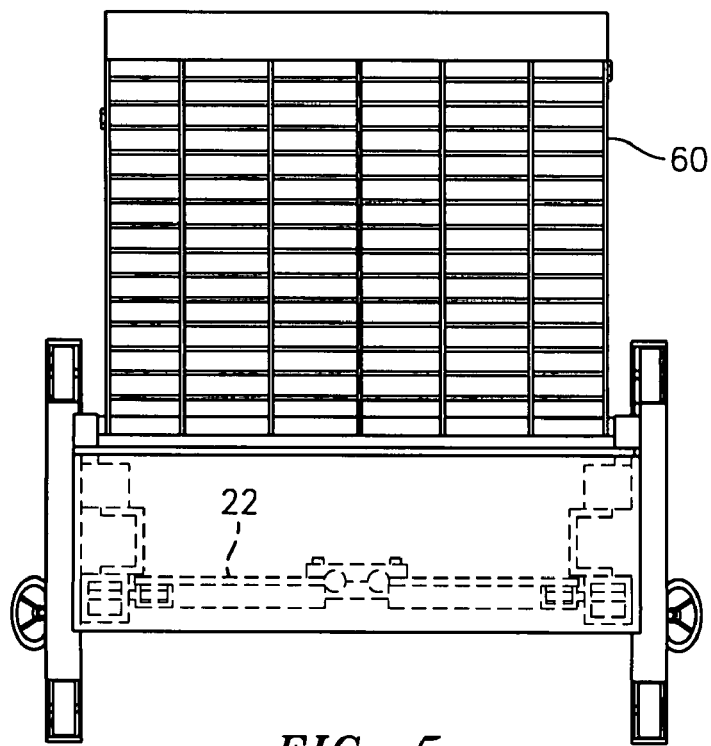

A grate 60 is shown in its lowered and stationary position in FIGS. 1, 4 and 5, and in its raised and movable position in FIG. 3. In its lowered position, grate 60 provides a stationary platform for a user to stand upon and practice the technique of forcibly opening a door. FIGS. 1 and 3 show the proximal end of grate 60 having two opposite members 63. Each member 63 is pivotally attached by a joint to the corresponding angle iron 64.

Referring to FIGS. 2 and 3, with the grate 60 in its raised position, the training device can be moved to a storage area by being rolled on wheels 61. As shown in FIGS. 1 and 3, a catch 62 is on opposite sides of the grate 60. When in its raised position, each catch 62 is captured and contained by a fastener 65.

As shown in FIG. 1 to 3, two wheels 61 are attached to an angle iron 64. Each angle iron 64 is welded to each opposite portion of the frame 1. Each wheel 61 is attached to the angle iron 64 by at least two and preferably four bolts, or by a similar fastener. A four inch angle iron is useful to make and use the training device.

Each wheel 61 on one side of the saddle 3 can be mounted on a swivel to form a caster. This allows one side of the training device to be rotated, which can be of assistance in storing the device.

Figure 9:
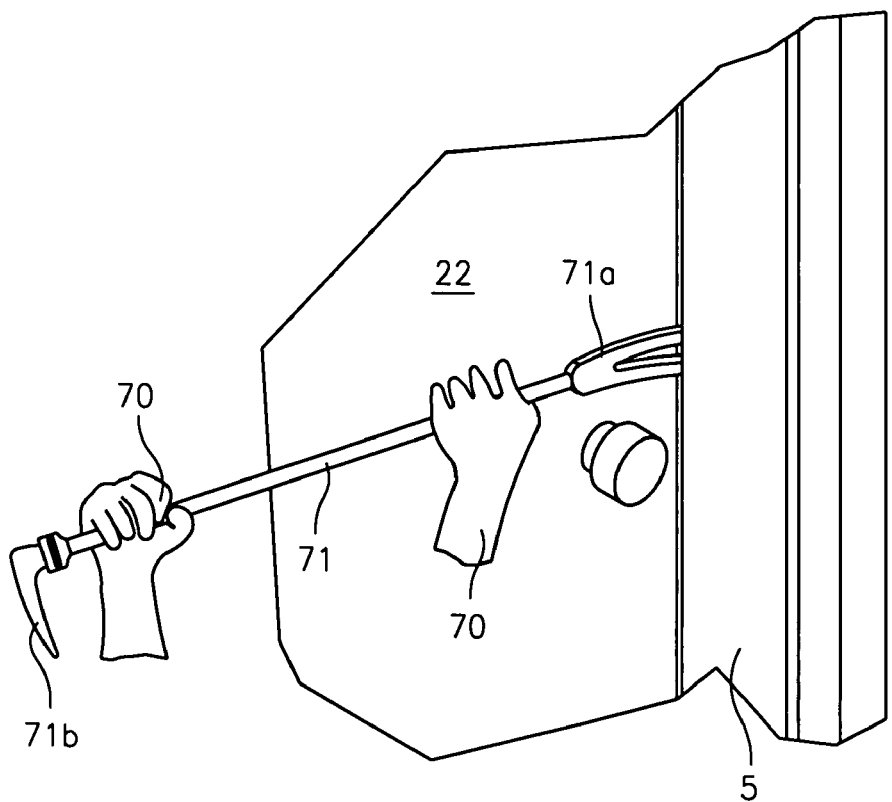
FIG. 9 is a cutaway and perspective view of FIG. 1, showing the use of a forcible entry tool on the right inswing door.

FIG. 9 shows a method of using the training device of FIG. 1. A person in an emergency or rescue service, for example, a fire fighter, places a firm grip from each hand 70 around a Halligan tool 71. The fire fighter then wedges the claw 71a between the stop 5 and the right inswing door 22. This provides a good mechanical advantage. The claw 71a is wedged slightly above or below the dead bolt 40. The claw 71a is then further wedged between the stop 5 and door 22 by striking the adze 71b with a hammer or similar tool. Using a portion of the claw 71a as a fulcrum, the Halligan tool 71 is then rotated. This causes the door 22 to pivot around the roll pin 41 at the proximal end of the dead bolt 40, and to move away from the stop 5 on the frame 1.

As shown in FIGS. 1, 2 and 4, a portion of one side of the jamb 4 abuts a portion of the stop 5. The abutting portion of the jamb 4 can be grooved in the area that is adjacent to the knob on the door 21 and 22. Without rotation, the Halligan tool 71 can become immovably wedged in the groove of the jamb 4.

Other devices that provide a mechanical advantage can be used instead of a Halligan tool 71 as shown. These devices include but are not limited to another manual device, for example, a crowbar, or a hydraulic forcible entry tool.

It is to be understood that the training device described herein can also be used to learn and perfect the skill of forcibly opening an outswing door. With a person or weight added to the grate 60 as shown in FIG. 1, the training device can be approached as shown in FIG. 2. The method of forcibly opening the device can then be essentially as described and shown for FIG. 9.

I claim:

1. A method for learning and perfecting the art of forcibly opening a locked door in an emergency, the method comprising:
   selecting a training device comprising:
   a frame having a header and a rectangular shaped saddle;
   a door placed in the frame, and having a first and a second edge perpendicular to the header and saddle;
   a lock rail attached to the door and having an opening;
   a dead bolt having a proximal end mounted in the door through the opening and a distal end extending out of the first edge in a locked position relative to said frame;
   a surface adjacent to the dead bolt;
   means for tightening the surface against said dead bolt;
   a rod attached to the second edge, the rod having an upper and a lower end, the upper end movably mounted to the header and the lower end mounted to the saddle;
   adjacent to said second edge, means for tensioning said door about said dead bolt;
   a grate pivotally mounted to the rectangular shaped saddle; and two wheels attached to each of the short sides of said rectangular saddle, wherein the two wheels on one of the short sides are each mounted on a swivel to form a caster;
step for bracing said training device;
positioning a person adjacent to the first edge and within an arm's length of the door;
wedging a tool between the frame and said first edge of said door, and above or below the dead bolt;
securing the tool between said frame and said door by striking its proximal end;
rotating said tool;
causing said door to initially pivot about said dead bolt; and
moving said dead bolt off of the surface.

2. The method of claim 1 wherein the step for bracing comprises: pivoting the grate to a position about perpendicular to said door and standing on said grate.

3. A training device comprising:
a frame having a header and a rectangular shaped saddle, and two vertical sides;
a jamb an each vertical side of the frame;
a door placed in the frame, and having a first and a second edge perpendicular to the header and rectangular shaped saddle;
a lock rail attached to the door and having a first opening;
a dead bolt having a proximal end mounted in each door through the first opening, and a distal end protruding from said door in a locked position relative to said frame;
a rod attached to the second edge and having
an upper and a lower end, the upper end of each rod movably mounted to the header and the lower end of each rod mounted to the saddle;
a vise having a movable jaw mounted on a block, and a stationary jaw, the vise attached to the jamb on each vertical side such that the dead bolt is protruding from the door and between the stationary and movable jaw;
means for tightening said movable jaw against said dead bolt;
adjacent to said second edge, means for tensioning said door about said dead bolt, wherein the means for tensioning is a coil spring, such that said door initially pivots about said dead bolt as it is being forcibly opened;
a grate pivotally mounted to said rectangular shaped saddle; and
two wheels attached to each of the short sides of said rectangular saddle, wherein the two wheels on one of the short sides are each mounted on a swivel to form a caster.

4. The training device of claim 3 wherein said movable jaw is wedge-shaped relative to the block.

5. The training device of claim 4 wherein said block has a proximal end adjacent to the means for tightening, and the proximal end has a second opening.

6. The training device of claim 5 wherein the means for tightening comprises: a shaft having a distal end mounted in the second opening, and the shaft has an external screw thread and means for rotating said shaft.

7. The training device of claim 6 wherein the means for tightening comprises: a housing attached to said frame, the housing having a third opening with an internal screw thread to accommodate the external screw thread of said shaft.

8. The device of claim 3 wherein the lock rail has a proximal end.

9. The device of claim 8 wherein the coil spring abuts the proximal end of said lock rail.

10. A training device comprising:
a frame having a header and a rectangular shaped saddle, and two vertical sides;
a jamb on each vertical side of the frame;
a left hand and a right hand inswing door placed in the frame, each door having an interior edge;
a lock rail attached to each door and having a first opening;
a dead bolt having a proximal end mounted in each door through the first opening and a distal end protruding from said door in a locked position relative to said frame;
a rod attached to each interior edge and having
an upper and a lower end, the upper end of each rod movably mounted to the header and the lower end of each rod mounted to the saddle;
a vise having a movable jaw mounted on a block, and a stationary jaw, the vise attached to the jamb on each vertical side such that the dead bolt is protruding from each door and between the stationary and movable jaw;
means for tightening said movable jaw against said dead bolt;
adjacent to each interior edge, means for tensioning said door about said dead bolt, wherein the means for tensioning is a coil spring, such that said door initially pivots about said dead bolt as it is being forcibly opened;
a grate pivotally mounted to said rectangular shaped saddle; and
two wheels attached to each of the short sides of said rectangular saddle, wherein the two wheels on one of the short sides are each mounted on a swivel to form a caster.

11. The device of claim 10 wherein the lock rail has a proximal end.

12. The device of claim 11 wherein the coil spring abuts the proximal end of said lock rail.

13. The training device of claim 10 wherein said movable jaw is wedge-shaped relative to the block.

14. The training device of claim 13 wherein said block has a proximal end adjacent to the means for tightening, and the proximal end has a second opening.

15. The training device of claim 14 wherein the means for tightening comprises: a shaft having a distal end mounted in the second opening, and the shaft has an external screw thread and means for rotating said shaft.

16. The training device of claim 15 wherein the means for tightening comprises: a housing attached to said frame, the housing having a third opening with an internal screw thread to accommodate the external screw thread of said shaft.

17. A method for learning and perfecting the art of forcibly opening a locked door in an emergency, the method comprising:
selecting a training device comprising:
a frame having a header and a rectangular shaped saddle, and two vertical sides;
a jamb on each vertical side of the frame;
a left hand and a right hand inswing door placed in the frame, each door having an interior edge;
a lock rail attached to each door and having an opening;
a dead bolt having a proximal end mounted in each door through the opening and a distal end protruding from said door in a locked position relative to said frame;
a rod attached to each interior edge and having
an upper and a lower end, the upper end of each rod movably mounted to the header and the lower end of each rod mounted to the saddle;
a vise having a movable jaw mounted on a block, and a stationary jaw, the vise attached to the jamb on each vertical side such that the dead bolt is protruding from each door and between the stationary and movable jaw;
means for tightening said movable jaw against said dead bolt; and adjacent to each interior edge, means for tensioning said door about said dead bolt, wherein the means for tensioning is a coil spring, such that said door initially pivots about said dead bolt as it is being forcibly opened;

a grate pivotally mounted to said rectangular shaped saddle; and two wheels attached to each of the short sides of said rectangular saddle, wherein the two wheels on one of the short sides are each mounted on a swivel to form a caster;

step for bracing said training device;

positioning a person adjacent to the first edge and within an arm's length of the door;

wedging a tool between the frame and said first edge of said door, and above or below the dead bolt;

securing the tool between said frame and said door by striking its proximal end;

rotating said tool;

causing said door to initially pivot about said dead bolt; and moving said dead bolt off of the surface.

18. The method of claim 17 wherein the step for bracing comprises: pivoting the grate to a position about perpendicular to said door and standing on said grate.

* * * * *